United States Patent [19]

Sano et al.

[11] Patent Number: 5,026,511
[45] Date of Patent: Jun. 25, 1991

[54] PROCESS FOR THE PRODUCTION OF POLYETHYLENE MATERIALS

[75] Inventors: Akira Sano, Kawasaki; Hirofumi Kamiishi; Seizo Kobayashi, both of Yokohama; Kazuo Matsuura, Tokyo; Shigeki Yokoyama, Yokohama, all of Japan

[73] Assignee: Nippon Oil Co., Ltd., Tokyo, Japan

[21] Appl. No.: 485,248

[22] Filed: Feb. 26, 1990

Related U.S. Application Data

[63] Continuation-in-part of Ser. No. 249,946, Sep. 27, 1988, abandoned.

[30] Foreign Application Priority Data

Oct. 1, 1987 [JP] Japan .................. 62-248818

[51] Int. Cl.$^5$ ............................................. B29C 35/02
[52] U.S. Cl. ....................................... 264/28; 264/120; 264/122; 264/126; 264/210.3; 264/210.7; 264/210.8; 264/320; 264/331.17; 264/343; 525/240
[58] Field of Search ............... 264/28, 210.2, 210.7, 264/210.1, 210.8, 210.3, 211, 343, 331.17, 345–346, 288.4, 289.3, 120, 122, 126; 525/240

[56] References Cited

U.S. PATENT DOCUMENTS

| 4,643,865 | 2/1987 | Okada et al. | 264/288.4 |
| 4,655,769 | 4/1987 | Zachariades | 264/41 |
| 4,769,433 | 9/1988 | Chanzy et al. | 264/288.4 |
| 4,800,121 | 1/1989 | Ohta et al. | 264/288.4 |
| 4,820,466 | 4/1989 | Zachariades | 264/323 |
| 4,824,619 | 4/1989 | Okada et al. | 264/288.4 |
| 4,833,172 | 5/1989 | Schwarz et al. | 264/289.3 |
| 4,853,427 | 8/1989 | Herten et al. | 264/171 |
| 4,879,076 | 11/1989 | Sano et al. | 264/210.7 |

FOREIGN PATENT DOCUMENTS

| 60-89333 | 5/1985 | Japan | 264/331.17 |
| 1142253 | 2/1969 | United Kingdom | 264/28 |

Primary Examiner—Jeffery Thurlow
Attorney, Agent, or Firm—Bucknam and Archer

[57] ABSTRACT

A process for producing a polyethylene material for use in products requiring high mechanical strength and high elastic modulus is disclosed. The process involves the use of a specific class of particulate polyethylenes having an intrinsic viscosity of 5–50 dl/g in decalin at 135° C. and the steps of compression molding, solvent immersing, solid-phase extruding or rolling and finally drawing the material in that order.

8 Claims, No Drawings

PROCESS FOR THE PRODUCTION OF POLYETHYLENE MATERIALS

This is a Continuation-in-Part application of U.S. Ser. No. 249,946, filed Sept. 27, 1988, now abandoned.

BACKGROUND OF THE INVENTION

1. Field of the Invention

This invention relates to a process for the production of polyethylene materials for fibers, films, sheets and the like of high mechanical strength and high elastic modulus.

2. Prior Art

Ethylene polymers of extremely high molecular weight of say one million or greater are generally known as ultrahigh molecular weight polyethylene hereinafter referred to as "UHMW polyethylene". Polyethylene of this type is in common use as an engineering plastic material characterized by high resistance to impact and to wear and also by peculiar self-lubrication. The polymer has been extensively applied to hoppers, silos, gears, linings and the like for use in various industrial sectors ranging from food processing, civil engineering, chemistry, agriculture and mining to backings for skiing plates and the like for use in sports and leisure supplies.

UHMW polyethylene if possibly highly oriented will provide stretched products that are superior in mechanical strength and elastic modulus. Such polymer, because of its high molecular weight, is literally too viscous for extrusion and orientation under usual molding conditions.

Japanese Patent Laid-Open Publication No. 56-15408 discloses that a gel resulting from a decalin dope of UHMW polyethylene is allowed to stretch-mold to give fibers of great strength and high elasticity. This dope however is rather low in polymer concentration, say 3 weight percent with a polymer of $1.5 \times 10^6$ in weight-average molecular weight and one weight percent with a polymer of $4 \times 10^6$. From the commercial point of view, such prior art method has much to be desired in that dope formation requires large amounts of solvents and meticulous attention in preparation and handling of highly viscous solutions.

To overcome or alleviate this problem, there have been proposed certain improved modes of molding as disclosed for instance in Japanese Patent Laid-Open Publication Nos. 59-187614, 60-15120 and 60-97836 and Preprints of the Society of High Polymers, Japan, vol. 34, p. 873 (1985), whereby UHMW polyethylene can be oriented at temperatures below its melting point as by extrusion, stretching or rolling. These methods involve diluting the polymer in xylene, decalin, kerosine or the like, followed by cooling or isothermal crystallization to form a single crystal mat which is then extruded and stretched in a solid phase. Such methods still leave the problem of exorbitant solvent consumption unsolved.

The present inventors, in an effort to overcome the foregoing difficulties of the prior art, have previously proposed, as disclosed in Japanese Patent Laid-Open Publication No. 63-66207, a process for producing a polyethylene material of great mechanical strength and high elastic modulus, which comprises drawing particulate polyethylene at temperatures below its melting point, the particulate polyethylene having an intrinsic viscosity in the range of 5-50 dl/g in decalin at 135° C. and derived by poymerizing ethylene at a temperature below such melting point and in the presence of a catalyst comprising a solid component containing at least one of titanium and vanadium compounds and an organometallic compound.

SUMMARY OF THE INVENTION

It has now been found that polyethylene fibers, films and sheets of excellent physical properties can be produced by a selected mode of molding from a particulate polyethylene which is obtainable by a selected polymerization reaction with a catalyst of a selected composition therefor.

It is therefore the primary object of the present invention to provide a process for producing polyethylene materials of great mechanical strength and high elastic modulus which is relatively simple and economically feasible without involving undesirable molten or dissolved polymer.

Other objects, aspects and features of the invention will be better understood from the following detailed description.

More specifically, the invention provides a process for producing a polyethylene material having an elastic modulus of higher than 150 GPa and a mechanical strength of greater than 4 GPa, which comprises (a) forming particulate polyethylene by polymerization of ethylene at a temperature lower than the melting point of the polyethylene and in the presence of a catalyst comprising a solid catalyst component containing either one or both of titanium and vanadium compounds and an organometallic compound, the polyethylene having an intrinsic viscosity of from 5 to 50 dl/g at 135° C. in decalin and a viscosity average molecular weight of from 400,000 to 12,000,000, (b) compression molding the polyethylene at a temperature not higher than the melting point thereof, (c) immersing preform (b) in an organic solvent, without dissolution, at a temperature of from 0° to 250° C. for from 1 second to 60 minutes, (d) solid-phase extruding or rolling preform (c) and (e) subsequently drawing preform (d).

The thus highly oriented polyethylene material obtained in accordance with the invention is characterized by high degrees of strength and elasticity compared to conventional counterparts available from drawing a gel or a hot-melt heated above the polyethylene melting point and further compared to solid-phase drawn materials which are not immersed in organic solvents.

DETAILED DESCRIPTION

UHMW polyethylene powders contemplated under the invention are produced by slurry polymerization in an inert solvent in the presence of a specific catalyst, or by gas-phase polymerization substantially without such inert solvent, but cannot be produced by other polymerization processes involving such high temperature as to melt or dissolve the formed polyethylene. The polymerization according to the invention is effected with the use of a catalyst comprising a component containing either one or both of titanium and vanadium compounds and an organometallic compound at a pressure in the range of 0–70 kg/cm²G and at a temperature below the melting point of polyethylene or usually in the range of −20°–110° C., preferably 0°–90° C. and with or without solvents which are organic and inert to Ziegler catalysts. Specific examples of such solvents include butane, pentane, hexane, heptane, octane, cyclohexane, benzene, toluene and xylene. Other high boiling organic solvents such as decalin, tetralin, decane and kerosine may also be used if necessary depending upon the particular manner of processing of UHMW polyethylene.

The molecular weight of UHMW polyethylene may be controlled by changing the polymerization temperature or pressure and with use of hydrogen if necessary.

Suitable titanium compounds include for example halides, alkoxy halides, alkoxides, halogen oxides and the like of titanium. Particularly preferred among these are tetravalent and trivalent compounds.

Tetravalent titanium compounds are those represented by the formula $$Ti(OR)_n X_{4-n}$$

where R is an alkyl group of 1-20 carbon atoms or an aryl or aralkyl group, X is a halogen atom, and n is $0 \leq n \leq 4$.

Specific examples include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, tributoxymonochlorotitanium, tetrabutoxytitanium, monopentoxytrichlorotitanium, monophenoxytrichlorotitanium, diphenoxydichlorotitanium, triphenoxymonochlorotitanium, triphenoxymonochlorotitanium, tetraphenoxytitanium and the like.

Trivalent titanium compounds may be titanium trihalides such as titanium trichloride.

Suitable vanadium compounds include for example tetravalent vanadium compounds such as vanadium tetrachloride, vanadium tetrabromide, vanadium tetraiodide, tetraethoxyvanadium and the like, pentavalent vanadium compounds such as vanadium oxytrichloride, ethoxydichlorovanadyl, triethoxyvanadyl, tributhoxyvanadyl, o-alkyl vanadate and the like, and trivalent vanadium compounds such as vanadium trichloride, vanadium triethoxide and the like.

The above titanium and vanadium compounds, either or both, may be treated with one or more electron donors such for example as ethers, thioethers, thiols, phosphines, stilbenes, arsines, amines, amides, ketones, esters and the like.

These transition metal compounds may be suitably used in combination with a magnesium compound. Eligible magnesium compounds include for example magnesium, magnesium hydroxide, magnesium carbonate, magnesium oxide, magnesium halides such magnesium chloride, magnesium bromide, magnesium iodide and magnesium fluoride and the like, double salts, mixed oxides, carbonates, chlorides and hydroxides each containing both a metal selected from silicon, aluminum and calcium and a magnesium atom, those inorganic solid compounds treated or reacted with oxygen-containing compounds, sulfur-containing compounds, aromatic hydrocarbons and halogen-containing materials, and those magnesium compounds having silicon- or aluminum-containing oxides. Any suitable known method may be employed to contact the titanium and vanadium compounds with the magnesium compound.

Organometallic compounds according to the invention are compounds of Groups I to IV metals which are known as part components of Ziegler type catalysts. Particularly preferred are organoaluminum compounds represented by the formula $$R_n AlX_{3-n}$$

where R is an alkyl group of 1-20 carbon atoms or an aryl or aralkyl group, X is a halogen atom, and n is $0 < n \leq 3$, and organozinc compounds of the formula $$R_2 Z_n$$

where R is an alkyl group of 1-20 carbon atoms, R being the same or different.

No particular restriction is imposed on the amount of the organometallic compound to be added which is usually in the range of 0.1-1,000 times per mol of titanium or vanadium or both.

The UHMW polyethylene in particulate form contemplated under the invention has an intrinsic viscosity in the range of 5-50 dl/g, preferably 8-30 dl/g, more preferably 10-25 dl/g, in decalin at 135° C. and a molecular weight in the range of 400,000-12,000,000, preferably 900,000-6,000,000, more preferably 1,250,000-4,500,000.

The particulate polyethylene according to the invention has a melting point higher than 138° C., preferably 39° C., more preferably 140° C., as a peak temperature measured without heat treatment by differential scanning calorimetry with a temperature rise of 5° C./minute.

The process of the invention involves the steps of compression molding the particulate UHMW polyethylene, immersing the molded product in an organic solvent, solid-phase extruding or rolling the molded product, and subsequently drawing the thus extruded or rolled product.

The compression molding according to the invention, though not restricted, may be effected in the case of solid-phase extrusion by compressing the UHMW powder in an extruder cylinder at a temperature below its melting point and at a pressure ranging from 10 MPa to 2 GPa, preferably from 20 to 500 MPa thereby providing a rod-like molded product. When UHMW polyethylene is extruded together with other polymers, they may be pressed to form a sheet about 0.1-2 mm thick at a temperature below their melting points and at a pressure of 0.1 Pa-2 GPa, preferably 0.5 Pa-500 MPa. Similar molding conditions apply to rolling the UHMW material to a sheet or film.

The organic solvents to be used for immersion of the UHMW powder include aromatic hydrocarbons such as benzene, toluene, xylene and o-dichlorobenzene, alicyclic hydrocarbons such as cyclohexane, decalin and tetralin, and aliphatic hydrocarbons such as n-paraffin, iso-paraffin and their mixture. Other organic solvents capable of swelling UHMW polyethylene may be used, but xylene and decalin are particularly preferred.

Immersion temperature is in the range of 0°-250° C., preferably 80°-200° C., and immersion time length, though not restricted, is usually 1 second to 60 minutes, preferably 30 seconds to 20 minutes.

The compression molded product, which has been immersion-treated, should be swollen in the organic solvent in a weight ratio of solvent (Ws) to polyethylene (Wp) of 0.1-20, preferably 0.5-15. The molded product is then subjected to solid-phase extrusion or rolling immediately or after removal of the organic solvent. Extrusion may be effected with use of a suitable extruder cylinder equipped with a die initially at 20°–130° C., preferably 90°–120° C., and at 0.01–0.1 GPa and then at above 20° C. preferably above 90° C. but below the melting point of the immersed product. The draw ratio varies with the molecular weight of polymers, the type of catalysts and the polymerization conditions, but may be chosen at will usually in the range of 2–100, preferably 3–50, more preferably 3–25, by changing the die diameter.

When combining UHMW polyethylene with other polymers for extrusion, the latter polymers may be previously shaped to a round pillar form which is halved vertically to sandwich the immersion-treated compressed product, and the composite material is then placed in the cylinder for extrusion at above 20° C., preferably above 90° C. but below the melting point of the compressed product, and at a draw ratio of 2–100, preferably 3–50, more preferably 3–25.

Rolling of the material of the invention may be done by any suitable known method whereby the material is formed while in solid phase into a sheet or film. The ratio of deformation may be widely chosen, which may be in terms of rolling efficiency (length after/length prior to rolling) in the range of 1.2–30, preferably 1.5–20. Rolling temperature should be above 20° C. but below the melting point of the material, preferably above 90° C. but below the melting point of the material. Rolling may of course be repeated in a multi-stage fashion.

Drawing carried out subsequent to rolling according to the invention may be by rolling or nipping, the latter being preferred, at a temperature usually in the range of 20°–150° C., preferably 20°–140° C., and at a speed of 1–100 mm per minute, preferably 5–50 mm per minute depending upon the molecular weight and composition of the polymer. The draw ratio is higher the better mechanical strength and elastic modulus of the resulting product. UHMW polyethylene according to the invention may be drawn or stretched to 20–150 times. It has been found that the product thus obtained in the form of fiber or film has a tensile elastic modulus of greater than 150 GPa and a mechanical strength of greater than 4 GPa.

The invention will be further described by way of the following examples.

EXAMPLE 1

(a) Preparation of Solid Catalyst Component

Into a 400-ml stainless steel pot having therein 25 stainless steel balls, each ½ inch in diameter, were placed 10 g of commercially available magnesium chloride anhydride and 4.3 g of aluminum triethoxide. The mixture was ball-milled in a nitrogen atmosphere at room temperature for 5 hours, followed by addition of 2.7 g of titanium tetrachloride. Ball milling was continued for further 16 hours. The resulting catalyst component had a per gram titanium content of 40 mg.

(b) Polymerization

A 2-liter stainless steel autoclave equipped with an induction stirrer was purged with nitrogen and charged with 1,000 ml of hexane, 1 mmol of triethylaluminum and 10 mg of the above catalyst component. The mixture was heated with stirring to 70° C. and the pressure in the system raised to 1.6 kg/cm$^2$G with hexane vapor pressure. Ethylene was then polymerization was initiated. Ethylene was continuously charged to maintain the system at 10 kg/cm$^2$G. Polymerization was continued for 20 minutes.

The polymer slurry was taken into a beaker with hexane vacuum-evaporated to give 72 g of white polyethylene, which showed an intrinsic viscosity of 15.2 dl/g in decalin at 135° C., and a melting point (main peak temperature) of 141.0° C. as measured by a differential scanning calorimeter (DSC—20 manufactured by Seiko Electronics Kogyo K. K.) at a temperature rise of 5° C./minute.

(c) Compression Molding

This molding operation was carried out by a press-molding machine equipped with a mold measuring 60 mm long, 35 mm wide and 3 mm deep into which was uniformly filled 1 g polymer. The polymer was pre-heated at 130° C. for 30 minutes and thereafter compressed at 40 MPa for 10 minutes to give a sheet-like product 0.5 mm thick.

(d) Solvent Immersion

A test piece of the above molded product measuring 50 mm long and 5 mm wide was immersed in decalin at 180° C. for 6 minutes. The test piece was taken out, air-dried for 24 hours and thereafter vacuum-dried at 80° C. for 6 hours.

(e) Solid-Phase Extrusion and Tensile Stretching

Into a partly modified Instron capillary rheometer equipped with a cylinder of 0.9525 cm in inside diameter and with a die of 0.42 cm in inside diamter and 1 cm in length was placed the test piece obtained in (ca), followed by extrusion in a high-density polyethylene billet (melt index, ASTM D-1238, 190° C., 2.16 kg = 2.0) at 110° C. at a constant speed of 3 mm/minute. The draw ratio by extrusion was 5 in terms of the ratio of cylinder to die cross-sectional area.

The resulting extrudate was stretch-molded by a tensile tester equipped with a constant-temperature chamber at 135° C. at a cross-head speed of 50 mm/minute to provide a molded product stretched at a draw ratio of 27 or a total draw ratio of 135. The product was tested for its mechanical strength and elastic modulus under the conditions given below and with the results shown in Table 1.

(f) Elastic Modulus and Mechanical Strength

Measurement was made of both qualities on a tester (Strograph R, Royo Seiki Seisakusho, Ltd.) at a temperature of 23° C. with a test piece of 150 mm in length and at a stretch speed of 100 mm/minute. Elastic modulus was determined by the stress at a strain of 0.1% with the cross-sectional area counted from the weight and length of the test piece as a polyethylene density of 1 g/cm$^3$.

COMPARATIVE EXAMPLE 1

The procedure of Example 1 was followed in preparing a draw-molded product having a total draw ratio of 105, except that the solvent immersion step (d) was omitted. The product was tested with the results shown in Table 1.

EXAMPLE 2

The procedure of Example 1 was followed with the exception that solvent immersion (d) was effected at 150° C. Test results as per Table 1.

EXAMPLE 3

The procedure of Example 1 was followed with the exception that the solid-phase extrudate was, without being first tensile-drawn, rolled and then tensile-stretched. In this instance, the solvent-immersed film provided in Example 1 (d) was fed in between a pair of rolls each 100 mm in diameter and 500 mm in surface length which were in rotation in opposite directions at different peripheral speeds at 130° C. thereby providing a film rolled at a ratio of 6. The film was stretched by a tensile tester with a constant-temperature chamber at a cross-head speed of 40 mm/minute at 120° C. The resulting stretched product was tested for its physical properties with the results shown in Table 1.

COMPARATIVE EXAMPLE 2

The procedure of Example 3 was followed except that the film was not solvent-immersed. Test results as per Table 1.

EXAMPLE 4

(a) UHMW Polyethylene Preparation

A 2-liter stainless steel autoclave equipped with an induction stirrer was purged with nitrogen and charged with 1,000 ml of hexane, 1 mmol of triethylaluminum and a catalyst resulting from reacting 0.5 mmol titanium tetrachloride and 0.5 mmol propylene oxide in 50 ml hexane at room temperature for 30 minutes. The mixture was heated with stirring to 60° C., and ethylene was then charged to a total pressure of 10 kg/cm$^2$G. Polymerization was continued for 3 hours.

The polymer slurry was taken into a beaker wherein the catalyst was decomposed by a hydrochloric acid-methanol mixture and was washed with hexane and vacuum-dried to give 120 g white polyethylene which showed an intrinsic viscosity of 32 dl/g in decalin at 135° C. and a melting point (main peak temperature) of 141.0° C. as measured by a differential scanning calorimeter of the above type at a temperature rise of 5° C./minute.

(b) Compression Molding

The above polymer was compression-molded as per Example 1 (c) to give a sheet-like product 0.5 mm thick.

(c) Solvent Immersion

A test piece, 60 mm long and 5 mm wide, cut from the above sheet product (b), was immersed in xylene at 13020° C. for 6 minutes. The test piece was removed from xylene, air-dried for 24 hours and vacuum-dried at 80° C. for 6 hours.

(d) Solid-Phase Extrusion and Tensile Stretching

The test piece (c) above was subjected to solid-phase extrusion and tensile stretching as per Example 1 (e) and tested with the results shown in Table 1.

COMPARATIVE EXAMPLE 3

The procedure of Example 4 was followed excepting solvent-immersion step (c). Test results as per Table 1.

EXAMPLE 5

The procedure of Example 4 was followed with the exception that solvent-immersion was effected at 100° C. for 10 minutes. Test results as per Table 1.

EXAMPLE 6

(a) Preparation of Solid Catalyst Component

The procedure of Example 1 was followed with the exception that 0.5 g of VO(OC$_2$H$_5$)$_3$ and 2.0 g of titanium tetrachloride were used in place of 2.7 g of titanium tetrachloride. There were 7.6 mg vanadium and 30.6 mg titanium per gram solid catalyst component.

(b) Polymerization

A 2-liter stainless steel autoclave similar to that in Example 1 (b) was charged with 1,000 ml of hexane, 1 mmol of triethylaluminum and 10 mg of the above catalyst component. The mixture was heated with stirring to 60° C. and the pressure in the system raised to 1.5 kg/cm$^2$G with hexane vapor pressure. Ethylene was then charged to a total pressure of 10 kg/cm$^2$G, and polymerization was initiated. Ethylene was continuously charged to maintain the system at 10 kg/cm$^2$G. Polymerization was continued for 30 minutes. The resulting polymer slurry was taken into a beaker with hexane removed in a vacuum to give 60 g of white polyethylene, which showed an intrinsic viscosity of 14.2 dl/g in decalin at 135° C.

(c) Compression Molding

The polymer of (b) above was subjected to compression-molding as per Example 1 (c) to provide a 0.5 mm thick sheet product.

(d) Solvent Immersion

The sheet product of (c) above was cut to provide a test piece measuring 60 mm long and 5 mm wide, which was immersed in decalin at 180° C. for 2 minutes. The test piece was taken out, air-dried for 24 hours and then vacuum-dried at 80° C. for 6 hours.

(e) Solid-Phase Extrusion and Tensile Stretching

The test piece of (d) above was subjected to solid-phase extrusion and tensile stretching as per Example 1 (e) and tested for its physical properties with the results shown in Table 1.

TABLE 1

| | Solvent Immersion | | | | Draw Ratio | | | Elastic | |
|---|---|---|---|---|---|---|---|---|---|
| | Solvent | Temperature (°C.) | Time (min) | Ws/Wp** | Solid-phase Extrusion | Tensile Stretching | Total | Modulus (GPa) | Strength (GPa) |
| Example 1 | decalin | 180 | 6 | 9 | 5 | 27 | 135 | 175 | 4.2 |
| Example 2 | decalin | 150 | 6 | 8 | 5 | 24 | 120 | 160 | 4.0 |
| Example 3 | decalin | 180 | 6 | 9 | 6* | 22 | 132 | 172 | 4.1 |
| Example 4 | xylene | 130 | 6 | 6 | 5 | 25 | 125 | 168 | 4.6 |
| Example 5 | xylene | 100 | 10 | 1 | 5 | 24 | 120 | 162 | 4.4 |
| Example 6 | decalin | 180 | 2 | 4 | 5 | 24 | 120 | 164 | 4.1 |
| Comparative Example 1 | — | — | — | — | 5 | 21 | 105 | 130 | 3.4 |

TABLE 1-continued

| | Solvent Immersion | | | | Draw Ratio | | | Elastic Modulus (GPa) | Strength (GPa) |
|---|---|---|---|---|---|---|---|---|---|
| | Solvent | Temperature (°C.) | Time (min) | Ws/Wp** | Solid-phase Extrusion | Tensile Stretching | Total | | |
| Comparative Example 2 | — | — | — | — | 6* | 20 | 120 | 136 | 3.7 |
| Comparative Example 3 | — | — | — | — | 5 | 22 | 110 | 132 | 3.7 |

*stretch ratio at rolling

**Ws/Wp = $\frac{\text{weight of solvent in compression-molded swollen product}}{\text{weight of polymer in compression-molded swollen product}}$

What is claimed is:

1. A process for producing a polyethylene material having an elastic modulus higher than 150 GPa, a mechanical strength greater than 4 GPa and a total draw ratio of 120–150 times, which comprises the steps of:
   (a) forming particulate polyethylene by polymerization of ethylene at a temperature lower than the melting point of said polyethylene and in the presence of a catalyst comprising a solid catalyst component containing a titanium compound and an organometallic compound, said polyethylene having an intrinsic viscosity of from 5 to 50 dl/g at 135° C. in decalin and a viscosity average molecular weight of from 400,000 to 12,000,000;
   (b) compression molding said polyethylene from step (a) at a temperature not higher than the melting point thereof to obtain preform (b);
   (c) immersing said preform (b) in an organic solvent, without dissolution, at a temperature of from 0° to 250° C. for from 1 second to 60 minutes whereby preform (b) is swollen to obtain preform (c);
   (d) solid-phase extruding or rolling said swollen preform (c) to obtain preform (d) and;
   (e) subsequently drawing preform (d).

2. The process of claim 1 wherein said polyethylene has a melting point above 138° C. as measured by differential scanning calorimetry at a temperature rise of 5° C./minutes.

3. The process of claim 1 wherein said organic solvent is one capable of swelling said polyethylene and selected from the group consisting of benzene, toluene, xylene, o-dichlorobenzene, cyclohexane, decalin, tetralin, n-paraffin, iso-paraffin and combinations thereof.

4. The process of claim 1 wherein the drawing is effected at a temperature of 20°–150° C. and at a speed of 1–100 mm per minute.

5. The process according to claim 1 wherein said preform (b) is swollen in said organic solvent in a weight ratio of solvent to polyethylene of from 0.1 to 20.

6. The process according to claim 1 wherein said step (a) is carried out at a temperature of $-20°$ C.–110° C. and at a pressure of 0–70 kg/cm²g.

7. The process according to claim 1 wherein said organometallic compound is an organoaluminum compound of formula $$R_nAlX_{3-n}$$

wherein R is an alkyl group of 1–20 carbon atoms or an aryl or aralkyl group, X is a halogen atom, and n is $0 < n \leq 3$, or an organozinc compound of formula $$R_2Zn$$

wherein R is an alkyl group of 1–20 carbon atoms, R being the same or different.

8. The process according to claim 1 wherein said step (d) is carried out at a temperature of 90°–120° C.

* * * * *